March 4, 1924. Re. 15,785

C. C. LILLIBRIDGE

OIL BURNER

Original Filed May 20, 1920 2 Sheets-Sheet 1

INVENTOR.

Curtis C. Lillibridge

BY

Erwin, Wheeler & Woodard,

ATTORNEYS.

WITNESS:

Fred Palm

DEL.

March 4, 1924. Re. 15,785

C. C. LILLIBRIDGE

OIL BURNER

Original Filed May 20, 1920 2 Sheets-Sheet 2

WITNESS:
Fred Palm
DEL.

INVENTOR.
Curtis C. Lillibridge
BY
Erwin, Wheeler & Woodard
ATTORNEYS.

Reissued Mar. 4, 1924. Re. 15,785

UNITED STATES PATENT OFFICE.

CURTIS C. LILLIBRIDGE, OF HUTCHINSON, KANSAS.

OIL BURNER.

Original No. 1,391,041, dated September 20, 1921, Serial No. 382,964, filed May 20, 1920. Application for reissue filed September 19, 1923. Serial No. 663,716.

*To all whom it may concern:*

Be it known that I, CURTIS C. LILLIBRIDGE, a citizen of the United States, residing at Hutchinson, in the county of Reno and State of Kansas, have invented certain new and useful Improvements in Oil Burners; and I do declare the following to be a full, clear, and exact description of the invention, such as will enable others skilled in the art to which it appertains to make and use the same.

My invention relates to hydrocarbon burners and more particularly to those which may be readily installed in connection with stoves and furnaces, without making any serious changes in the construction thereof. The invention relates more particularly to devices of this character in which the burner is located beneath the delivery end of an air supply neck, and one object is to provide a novel form of suporting bracket for the burner provided with means for receiving any overflow from such burner.

Other objects are to provide the supporting bracket with means for properly centering the burner beneath the air supply neck and to provide said burner with neck engaging means for always positioning its overflow spout in proper relation with the overflow pan carried by the bracket.

A still further object is to provide an auxiliary air heater which serves as a support both for the air inlet neck and the burner supporting bracket.

With the foregoing and minor objects in view, the invention resides in the novel construction and arrangement of parts hereinafter described and claimed, the descriptive matter being supplemented by the accompanying drawings.

Figure 1:
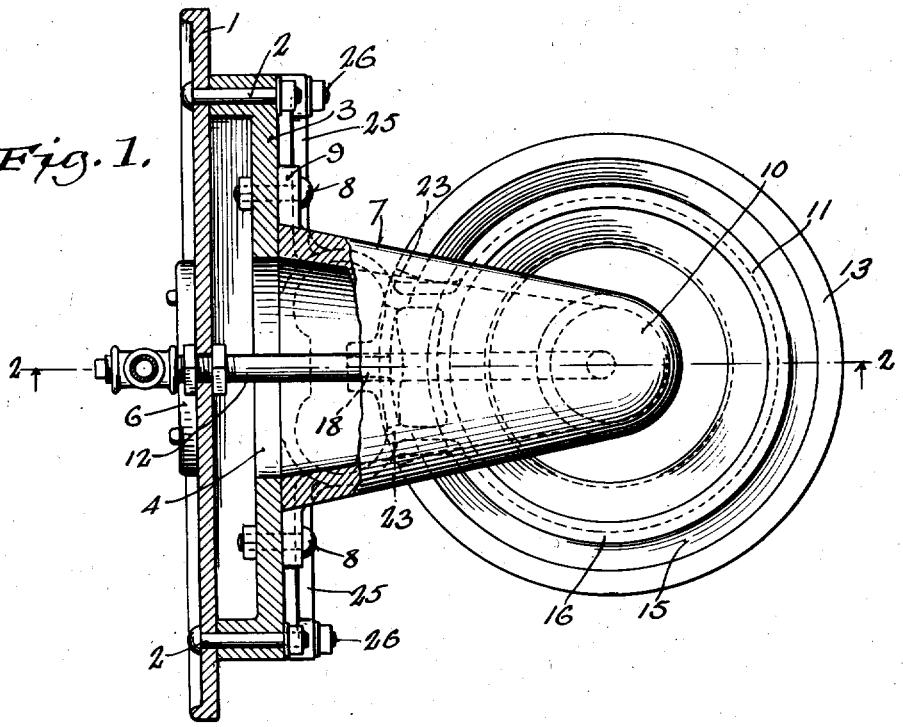
Figure 1 is a top plan view partly in horizontal section.

In the drawings above briefly described, the numeral 1 designates a plate adapted to be substituted for the usual coaling door of a stove or furnace, although it will be understood that the parts hereinafter described might be mounted otherwise than on said plate 1, if desired. Secured to the inner side of plate 1, by bolts or the like 2, is an air pre-heating casing 3 having an outlet opening 4 and a number of air inlets 5 controlled by a damper 6. A substantially conical air inlet neck 7 extends horizontally from the casing 3 and has its larger end secured by bolts or other preferred fasteners 8, to said casing, said bolts preferably passing through lateral ears 9 with which the neck 7 is provided. The smaller end of the neck 7 turns downwardly as indicated at 10 and a burner 11 is positioned under said end. The fuel may well be supplied to this burner through a tube 12 passing through the plate 1 and extending through the neck 7.

The burner 11 may vary in construction but I prefer to employ the details shown. An outer pan 13 is provided having a solid bottom 14 and an upwardly flared side wall 15, and loosely received within said pan 13, is a similar pan 16 preferably having an annular rib 17 disposed directly beneath the wall of the neck end 10. The rib 17 traps a quantity of oil to be used in starting the burner. Any overflow from the pan 16 will be caught in the pan 15 and thus the oil will burn not only in the pan 16, but between this pan and the wall 15, producing an intense heat. Any overflow from pan 15 takes place through a spout 18 with which said pan is equipped, such overflow being discharged into a relatively small pan 19 carried by a burner supporting bracket 20.

Figure 2:
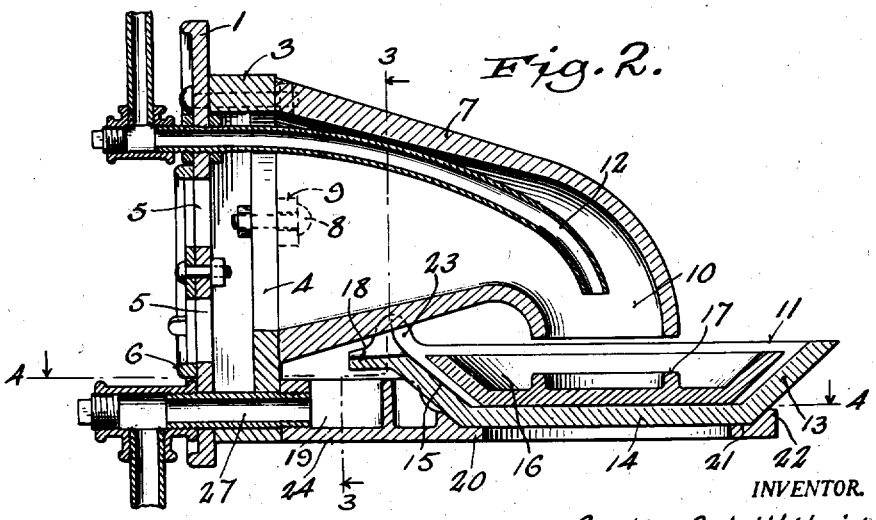
Fig. 2 is a vertical section on the plane of line 2—2 of Fig. 1.
Figure 3:
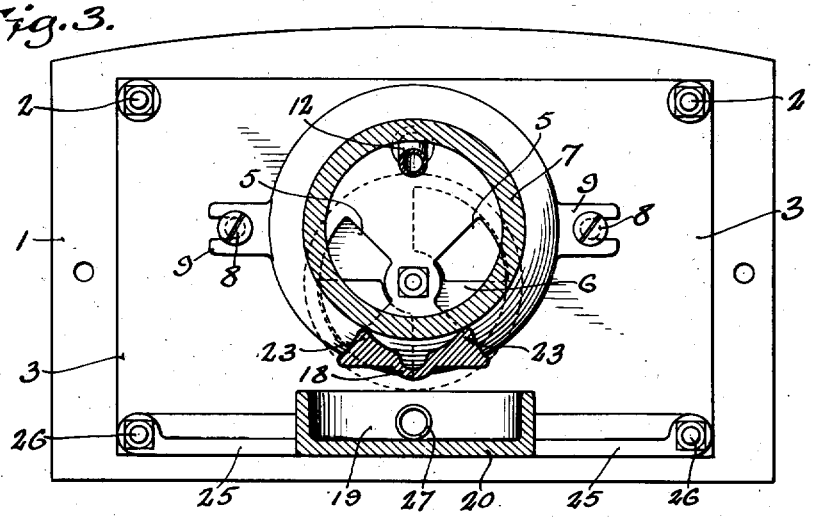
Fig. 3 is a vertical transverse section on the line 3—3 of Fig. 2.

The bracket 20 is provided with a horizontal portion 21 upon which the burner 11 rests, and with an annular rib 22 to properly position said burner, and to insure that the overflow spout 18 shall be properly disposed over the pan 19, the edge of the wall 15 is provided with a pair of upstanding lugs 23 which straddle the lower portion of the neck 7 as shown in Figs. 1, 2 and 3.

Figure 4:
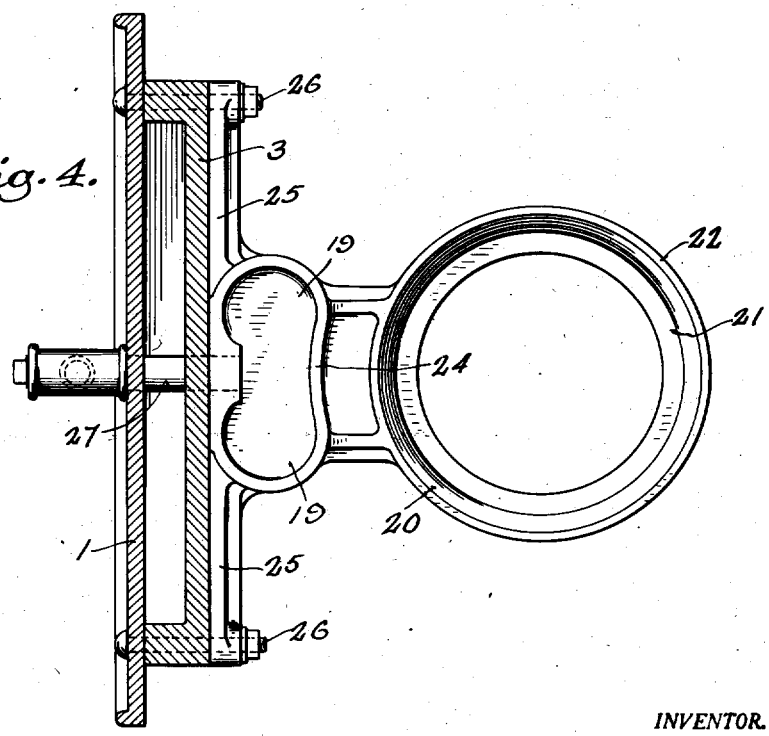
Fig. 4 is a horizontal section as indicated by line 4—4 of Fig. 2, with the burner removed from its supporting bracket.

The burner engaging parts 21 and 22 of the bracket 20 are preferably of the annular form shown, although should the burner be of other shape, these parts will be correspondingly changed. Between the portions 21 and 22 and the pre-heating casing 3, the bracket 20 includes a horizontal plate-like portion 24 which forms the bottom of the pan 19, and a pair of horizontal arms 25 extend oppositely from said pan, these arms being secured by bolts or the like 26 to the casing 3. For ease of manufacture, all parts of the bracket 20 are preferably cast in a single piece as shown clearly in Figs. 2 and 4.

For carrying off the overflow from the pan 19, a suitable pipe 27 may be provided and although this pipe by preference extends through the casing 3 and the plate 1, it might be otherwise located, if desired.

By employing the construction shown, and described, the device may be inexpensively manufactured and easily installed, yet will be highly efficient and in every way desirable. The oil burning at the burner 11 heats the air inlet neck 7 and all other adjacent parts so that the incoming air and fuel are well heated to produce best results, the air being initially heated within the casing 3. Any overflow from pan 16 is caught within pan 13 and if the latter overflows the fuel is caught by the pan 19 and discharged through the pipe 27.

In the operation of my invention, the pan 16 becomes quickly heated in the combustion of the oil dripping from the pipe 12, as does the air pre-heating casing 3. Instant volatilization of the oil therefore takes place, which with the pre-heated air passing through the conical neck 7, produces a highly combustible mixture which becomes incandescent and is completely consumed, creating the highest number of heat units and leaving no residuum.

In case the flame for any reason should become extinguished, the overflow of fuel through the pipe 27, will act through automatically operating devices such as are shown in my prior Patent No. 1,243,194, granted October 16, 1917, to cut off the further flow of oil and prevent flooding of the furnace.

Having thus described my invention, what I claim and desire to secure by Letters Patent of the United States, is:

1. A device of the class described comprising a horizontal bracket, a substantially horizontal air supply neck fixed at one end and extending over said bracket in close proximity thereto, the other end of said neck being downwardly turned, said bracket having an overflow pan under the fixed end of said neck, and a burner resting on said bracket under said downwardly turned end of said neck, said burner having an overflow spout adapted to extend over the edge of said overflow pan, said burner being additionally provided with spaced lugs adapted to straddle said neck to properly position said spout.

2. A device of the class described comprising a horizontally elongated overflow pan, a pair of attaching arms integral with and extending oppositely from the ends of said pan flush with one side of said pan, a horizontal plate-like portion integral with and extending laterally from the other side of said pan flush with the pan bottom, and a horizontal burner supporting ring integral at its periphery with said plate-like portion, said ring having an integral upstanding annular rib to surround a burner.

3. The combination with a fixed vertical support, of a substantially horizontal air supply neck fixed at one end to said support and having its other end turned downwardly, an overflow pan secured to said support immediately under the fixed end of said neck, said pan having an integral horizontal plate-like portion extending toward the free end of said neck, a burner supporting ring axially alined with the downturned end of said neck and formed integrally with said plate-like portion, and a burner resting on said ring and having an overflow spout extending over the edge of said overflow pan and located in close proximity to said air supply neck, said burner being additionally provided with a pair of horizontally spaced upstanding lugs formed integrally with its upper edge and straddling said neck to properly position said spout with respect to said pan.

4. A device of the class described comprising an overflow pan, attaching means at one side of the pan, a horizontal plate like portion integral with and extending laterally from the other side of said pan flush with the pan bottom, and a horizontal burner supporting ring integral at its periphery with said plate like portion, said ring having an integral upstanding annular rib to surround a burner, and an outlet for said overflow pan.

5. A device of the class described comprising a horizontal bracket, a substantially horizontal air supply neck fixed at one end and extending over said bracket in close proximity thereto, the other end of said neck being downwardly turned, said bracket having an overflow pan under the fixed end of said neck, a burner resting on said bracket under said downwardly turned end of said neck, said burner having an overflow spout adapted to extend over the edge of said overflow pan, means for properly positioning said spout with relation to said overflow pan, and an outlet for said overflow pan.

6. The combination with a fixed vertical support, of a substantially horizontal air supply neck fixed at one end to said support and having its other end turned downwardly, an overflow pan secured to said support immediately under the fixed end of said neck, said pan having an integral horizontal plate-like portion extending toward the free end of said neck, a burner supporting ring axially alined with the downturned end of said neck and formed integrally with said plate-like portion, and a burner resting on said ring and having an overflow spout extending over the edge of said overflow pan and located in close proximity to said air supply neck, means for properly positioning said spout with relation to said overflow pan, and an outlet for said overflow pan.

In testimony whereof, I have signed my name at Hutchinson, Kansas, this 15th day of September, 1923.

CURTIS C. LILLIBRIDGE.

Witnesses:
WARREN K. WHITE,
INEZ M. PAYNE.